United States Patent
Iwamura et al.

(10) Patent No.: US 11,546,585 B2
(45) Date of Patent: Jan. 3, 2023

(54) ENCODING DEVICE, DECODING DEVICE, AND PROGRAM

(71) Applicant: NIPPON HOSO KYOKAI, Tokyo (JP)

(72) Inventors: Shunsuke Iwamura, Tokyo (JP); Shimpei Nemoto, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 17/178,961

(22) Filed: Feb. 18, 2021

(65) Prior Publication Data

US 2021/0176466 A1 Jun. 10, 2021

Related U.S. Application Data

(63) Continuation of application No. PCT/JP2019/032401, filed on Aug. 20, 2019.

(30) Foreign Application Priority Data

Aug. 20, 2018 (JP) .............................. JP2018-154249

(51) Int. Cl.
*H04N 19/11* (2014.01)
*H04N 19/176* (2014.01)
(Continued)

(52) U.S. Cl.
CPC ........... *H04N 19/11* (2014.11); *H04N 19/119* (2014.11); *H04N 19/159* (2014.11); *H04N 19/176* (2014.11)

(58) Field of Classification Search
CPC .. H04N 19/463; H04N 19/593; H04N 19/176; H04N 19/159; H04N 19/119
See application file for complete search history.

(56) References Cited

U.S. PATENT DOCUMENTS 9,973,757 B2 * 5/2018 Puri ..................... H04N 19/105
2012/0082222 A1 * 4/2012 Wang ................... H04N 19/593
375/240.12
(Continued)

FOREIGN PATENT DOCUMENTS

JP 2018-121318 A 8/2018
JP 2019-054517 A 4/2019
WO 2017/090967 A1 6/2017

OTHER PUBLICATIONS

Supervised by Sakae Okubo, "Impress Standard Textbook Series H.265/HEVC textbook", Oct. 21, 2013, pp. 161-178.
(Continued)

*Primary Examiner* — Tsion B Owens
(74) *Attorney, Agent, or Firm* — Studebaker & Brackett PC

(57) ABSTRACT

An encoding device (1) according to the present invention includes: an encoding processing order determiner (11) configured to determine encoding processing order of blocks to be encoded; an intra-prediction mode candidate generator (12) configured to generate intra-prediction mode candidates of the blocks to be encoded, based on the encoding processing order; an intra-prediction mode determiner (13) configured to determine intra-prediction modes to be applied to the blocks to be encoded from the intra-prediction mode candidates; an intra predictor (14) configured to perform intra-prediction processing on the blocks to be encoded, based on the determined encoding processing order and the intra-prediction modes; and an entropy encoder (15) configured to perform entropy encoding processing on the encoding processing order and the intra-prediction modes.

14 Claims, 11 Drawing Sheets

(51) Int. Cl.
H04N 19/119 (2014.01)
H04N 19/159 (2014.01)

(56) References Cited

U.S. PATENT DOCUMENTS

2018/0176601 A1* 6/2018 Jeong .................. H04N 19/593
2018/0324434 A1* 11/2018 Piao ...................... H04N 19/44
2018/0376147 A1 12/2018 Iwamura et al.
2021/0021809 A1* 1/2021 Kim ..................... H04N 19/186

OTHER PUBLICATIONS

Xiulian Peng, et al., "Improved intra frame coding by PU/TU reordering", JVTVC-C275, Oct. 2010.
International Search Report issued in PCT/JP2019/032401; dated Nov. 19, 2019.

* cited by examiner

Z SCANNING ORDER

REVERSE Z SCANNING ORDER

N SCANNING ORDER

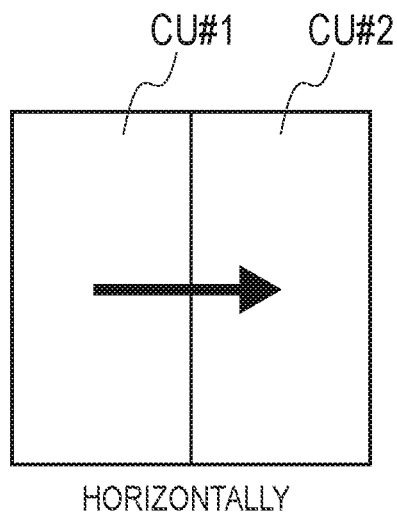
FIG. 7A — HORIZONTALLY FORWARD SCANNING
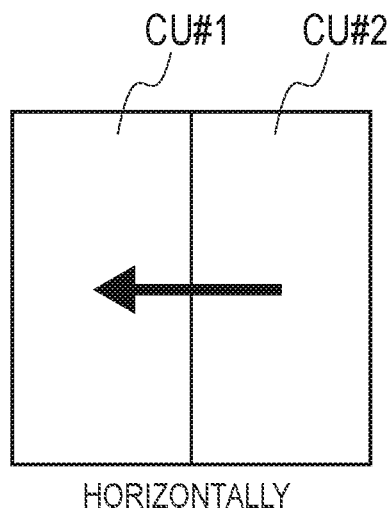
FIG. 7B — HORIZONTALLY REVERSE SCANNING
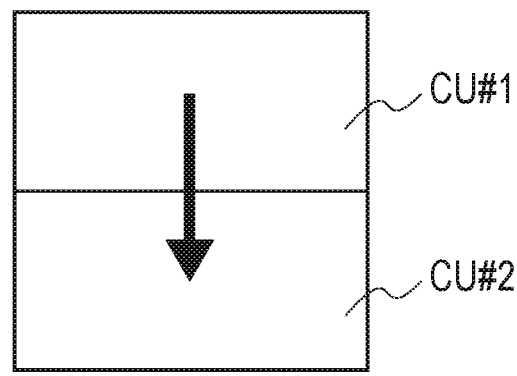
FIG. 7C — VERTICALLY FORWARD SCANNING
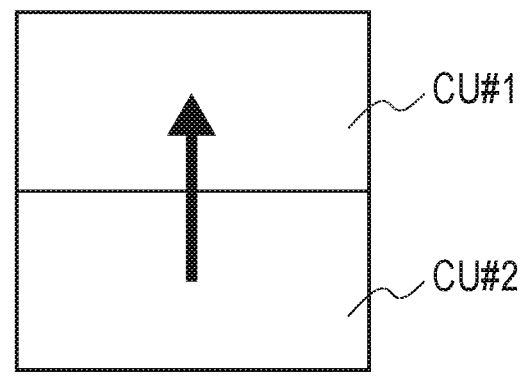
FIG. 7D — VERTICALLY REVERSE SCANNING

ENCODING DEVICE, DECODING DEVICE, AND PROGRAM

TECHNICAL FIELD

The present invention relates to an encoding device, a decoding device, and a program.

BACKGROUND ART

In an H.265/high efficiency video coding (HEVC) moving image (video) encoding system represented by a next generation video compression technique, residual signals are generated by performing prediction while switching prediction between two types of inter-prediction using temporal correlation between frames and intra-prediction using spatial correlation in the frame, then, orthogonal transformation processing, loop filter processing and entropy encoding processing are performed, and a stream obtained through the entropy encoding processing is output.

In the intra-prediction in the HEVC, a total of 35 types of intra-prediction modes including Planar prediction, DC prediction, direction prediction, and the like, are prepared. A decoding device generates a predictive image by performing intra-prediction using adjacent decoded reference pixels in accordance with the intra-prediction mode determined at an encoding device (encoder). Hereinafter, unless otherwise described, a "reference pixel" refers to a decoded reference pixel.

In the HEVC in related art, encoding is performed by dividing an original image of a frame unit constituting a moving image into a plurality of blocks (hereinafter, referred to as coding tree units (CTUs)) having a fixed size, and applying hierarchical quad-tree division to the respective CTUs.

An encoding device performs encoding processing on the divided blocks to be encoded (hereinafter, referred to as coding units (CUs)) while switching prediction between intra-prediction and inter-prediction. Further, this encoding processing is performed in encoding processing order from the upper left to the lower right (encoding processing order starting from an upper left CU to an upper right CU, a lower left CU and a lower right CU, hereinafter, referred to as Z scanning) defined in advance.

As described above, in the intra-prediction mode, a predictive image is generated using the reference pixels. However, in this intra-prediction mode, encoding processing proceeds in order of the Z scanning as will be described later, and thus, there may be a case where reference pixel on an upper right side or on a lower left side of the CU has not been decoded.

In such a case, a predictive image is generated using a value in which a decoded reference pixel which is the closest as the reference pixel is zero-order extrapolated (for example, see Non Patent Literature 1).

Further, in the HEVC, a reference pixel to be used to generate a predictive image is created through processing of inserting a specified value (such as, for example, "512" in a case of a moving image of 10 bits) in a block for which adjacent decoded reference pixels do not exist, such as a block located on the upper left corner within the frame.

As described above, in a case where a reference pixel which has not been decoded exists, if direction prediction is performed from a direction in which the reference pixel which has not been decoded is located, prediction accuracy degrades, which eventually degrades encoding efficiency.

To address this, a technique is known which achieves improvement of prediction accuracy by making encoding processing order flexible so as to include reverse N scanning (encoding processing order starting from an upper right CU to a lower right CU, an upper left CU and a lower left CU) and reverse Z scanning (encoding processing order starting from a lower left CU to a lower right CU, an upper left CU and an upper right CU) in addition to the Z scanning in intra-prediction (see Non Patent Literature 2).

In the technique defined in Non Patent Literature 2, a flag indicating what kind of encoding processing order is to be used is transmitted in a CU unit, and a flag indicating an intra-prediction mode which is applicable to each CU is transmitted.

Further, in the technique defined in Non Patent Literature 2, the intra-prediction mode of each CU is selected from fixed 35 intra-prediction modes in a similar manner to the HEVC, and the intra-prediction mode to be transmitted is subjected to entropy encoding processing in a similar manner to the HEVC.

CITATION LIST

Non Patent Literature

Non Patent Literature 1: Supervised by Sakae Okubo, "Impress Standard Textbook Series H.265/HEVC textbook"

Non Patent Literature 2: Xiulian Peng, et. al., "Improved intra frame coding by PU/TU reordering", JVTVC-C275, October 2010

SUMMARY OF INVENTION

Technical Problem

However, even in a case where encoding processing order (scanning order) is selectable as disclosed in Non Patent Literature 2, and the reverse Z scanning or the N scanning is selected, there is a problem that accuracy of intra-prediction may degrade.

For example, as illustrated in FIG. 14, in a case where the reverse Z scanning is selected as encoding processing order to be performed on the divided CUs, intra-prediction processing is performed on a CU #3 (lower left CU), a CU #4 (lower right CU), a CU #1 (upper left CU), and a CU #2 (upper right CU), in this order.

Here, as in the example in FIG. 14, in a case where the intra-prediction mode of each CU is an intra-prediction mode which utilizes reference pixels adjacent on a left side and on an upper side, encoding processing is performed in the reverse Z scanning. This makes it impossible to utilize a reference pixel on an upper side which can be referred to in the Z scanning, at the CU #4 (lower right CU) and the CU #3 (lower left CU).

In other words, in a case where the reverse Z scanning is selected as in the example in FIG. 14, an intra-prediction mode which utilizes reference pixels located on the left side and on the upper side is less likely to be selected.

As described above, in Non Patent Literature 2, a flag indicating an intra-prediction mode is entropy encoded in a similar manner to the HEVC although probabilities of the selected intra-prediction modes are biased in accordance with encoding processing order, and Non Patent Literature 2 does not take into account the above-described bias of the probabilities of the intra-prediction modes.

Further, in Non Patent Literature 2, the encoding device side needs to try all combinations as to what kind of intra-prediction mode is selected for each CU in all kinds of selectable encoding processing order, which causes a problem that a calculation period on the encoding device side increases.

The present invention has been therefore made to solve the above-described problems and an object of the present invention is to provide an encoding device, a decoding device, and a program which achieve improvement of encoding efficiency while reducing a calculation period on the encoding device side by reducing an amount of information to be transmitted by the encoding device.

Solution to Problem

An encoding device according to a first feature of the present invention configured to divide an original image of a frame unit constituting a moving image into a plurality of blocks and encode the blocks, the encoding device concludes: an encoding processing order determiner configured to determine encoding processing order of blocks to be encoded; a generator configured to generate intra-prediction mode candidates of the blocks to be encoded, based on the determined encoding processing order; an intra-prediction mode determiner configured to determine intra-prediction modes to be applied to the blocks to be encoded from the generated intra-prediction mode candidates; an intra predictor configured to perform intra-prediction processing on the blocks to be encoded, based on the determined encoding processing order and the determined intra-prediction modes; and an entropy encoder configured to perform entropy encoding processing on the determined encoding processing order and the determined intra-prediction modes.

A decoding device according to a second feature of the present invention configured to decode an image of a frame unit constituting a moving image for each of divided blocks, the decoding device concludes:

a decoding processing order acquirer configured to acquire decoding processing order of blocks to be decoded by performing entropy decoding processing on a stream output from an encoding device;

a generator configured to generate intra-prediction mode candidates of the blocks to be decoded, based on the acquired decoding processing order;

an intra-prediction mode acquirer configured to acquire intra-prediction modes to be applied to the blocks to be decoded by performing entropy decoding processing on the stream based on the generated intra-prediction mode candidates; and an intra predictor configured to perform intra-prediction processing on the blocks to be decoded, based on the acquired decoding processing order and the acquired intra-prediction modes.

A third aspect of the present invention is summarized as a program for causing a computer to function as the encoding device according to the above-described first feature.

A fourth aspect of the present invention is summarized as a program for causing a computer to function as the decoding device according to the above-described second feature.

Advantageous Effects of Invention

According to the present invention, it is possible to provide an encoding device, a decoding device and a program which achieve improvement of encoding efficiency while reducing a calculation period on the encoding device side by reducing an amount of information to be transmitted by the encoding device.

BRIEF DESCRIPTION OF DRAWINGS

FIG. 7A is a diagram for explaining a modified example of the first embodiment.

FIG. 7B is a diagram for explaining a modified example of the first embodiment.

FIG. 7C is a diagram for explaining a modified example of the first embodiment.

FIG. 7D is a diagram for explaining a modified example of the first embodiment.

DESCRIPTION OF EMBODIMENTS

First Embodiment

An encoding device 1 and a decoding device 3 according to a first embodiment of the present invention will be described below with reference to FIG. 1 to FIG. 6.

Here, the encoding device 1 and the decoding device 3 according to the present embodiment support intra-prediction in a moving image encoding system such as HEVC. Note that the encoding device 1 and the decoding device 3 according to the present embodiment can support an arbitrary moving image encoding system for performing intra-prediction.

The encoding device 1 according to the present embodiment divides an original image of a frame unit constituting a moving image into CUs to be encoded and encodes the CUs. Hereinafter, a case will be described as an example in the present embodiment where an original image of a frame unit constituting a moving image is hierarchically quad-tree divided and encoded.

Figure 1:
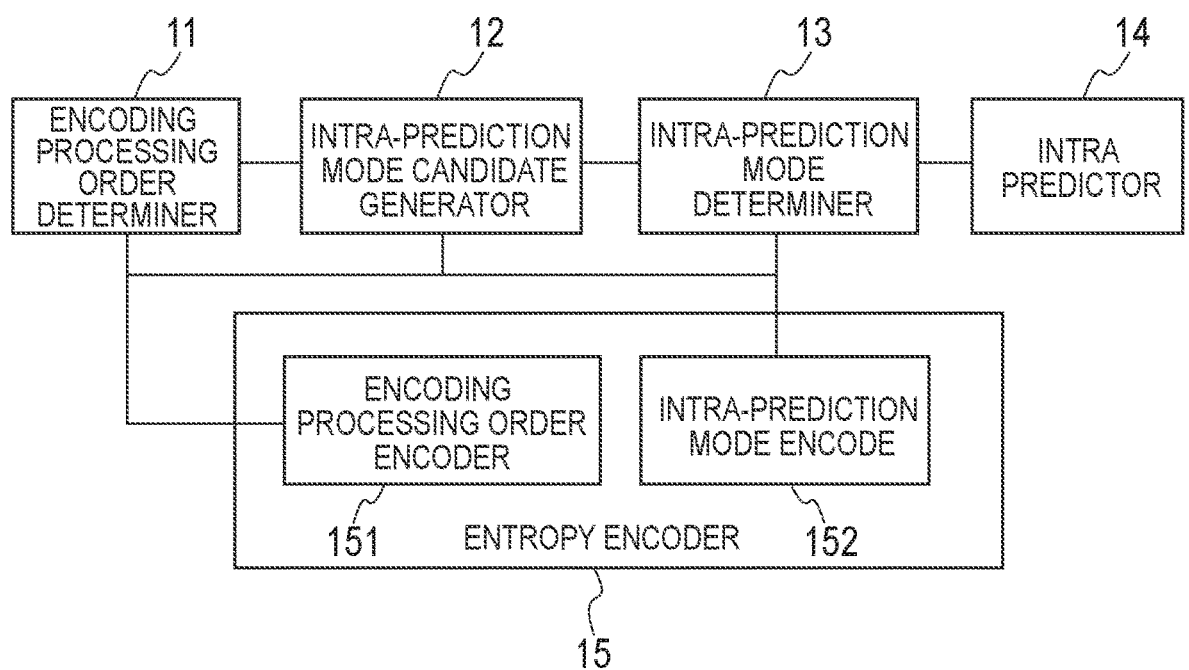
FIG. 1 is a diagram illustrating an example of a functional block configuration of an encoding device according to a first embodiment.

As illustrated in FIG. 1, the encoding device 1 according to the present embodiment includes an encoding processing order determiner 11, an intra-prediction mode candidate generator 12, an intra-prediction mode determiner 13, an intra predictor 14, and an entropy encoder 15.

The encoding processing order determiner 11 determines (selects) encoding processing order (hereinafter, scanning order) of CUs to be encoded (blocks to be encoded). Specifically, the encoding processing order determiner 11 determines what kind of encoding processing order is applied to the respective divided CUs. Note that the decoding device 3 performs decoding processing on the respective CUs in the scanning order determined by the encoding processing order determiner 11. Thus, at the decoding device 3, the scanning order corresponds to decoding processing order.

Figure 2A:
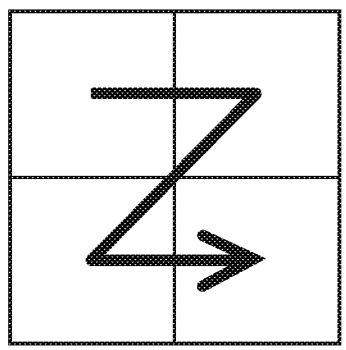
FIG. 2A is a diagram illustrating an example of scanning order to be used at the encoding device and a decoding device according to the first embodiment.
Figure 2B:
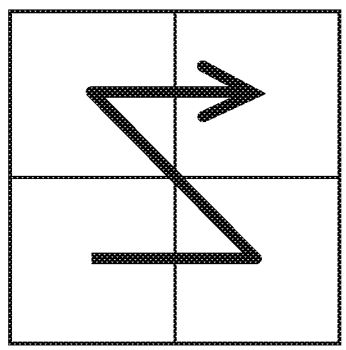
FIG. 2B is a diagram illustrating an example of scanning order to be used at the encoding device and a decoding device according to the first embodiment.
Figure 2C:
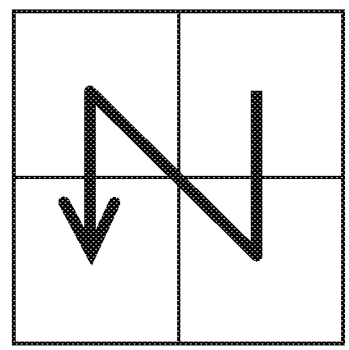
FIG. 2C is a diagram illustrating an example of scanning order to be used at the encoding device and a decoding device according to the first embodiment.

FIG. 2A, FIG. 2B and FIG. 2C illustrate an example of scanning order which is selectable by the encoding processing order determiner 11. The scanning order illustrated in FIG. 2A is referred to as Z scanning (order starting from an upper left CU to an upper right CU, a lower left CU, and a lower right CU), the scanning order illustrated in FIG. 2B is referred to as reverse Z scanning (order starting from the lower left CU to the lower right CU, the upper left CU, and the upper right CU), and the scanning order illustrated in FIG. 2C is referred to as N scanning (order starting from the upper right CU to the lower right CU, the upper left CU, and the lower left CU).

Figure 3A:
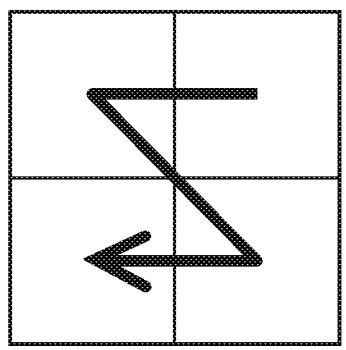
FIG. 3A is a diagram illustrating an example of encoding processing order (scanning order) to be used at the encoding device and the decoding device according to the first embodiment.
Figure 3B:
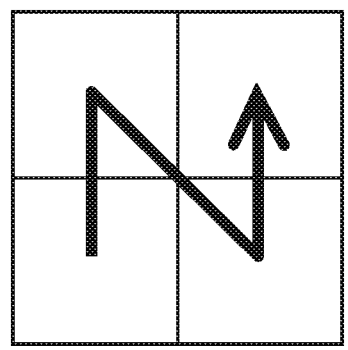
FIG. 3B is a diagram illustrating an example of encoding processing order (scanning order) to be used at the encoding device and the decoding device according to the first embodiment.

While a case will be described below as an example in the present specification where the encoding processing order determiner 11 can select Z scanning, reverse Z scanning or N scanning, the present invention can also be applied to scanning order illustrated in FIG. 3A and FIG. 3B other than the scanning order illustrated in FIG. 2A, FIG. 2B and FIG. 2C. Here, in a case where the scanning order illustrated in FIG. 3A is applied, processing similar to that of the N scanning can be applied, and in a case where the scanning order illustrated in FIG. 3B is applied, processing similar to that of the reverse Z scanning can be applied.

The intra-prediction mode candidate generator 12 generates intra-prediction mode candidates of the CUs to be encoded, based on the scanning order determined (selected) by the encoding processing order determiner 11. Hereinafter, description will be provided using an example of an intra-prediction mode which is applicable in the HEVC.

Figure 4:
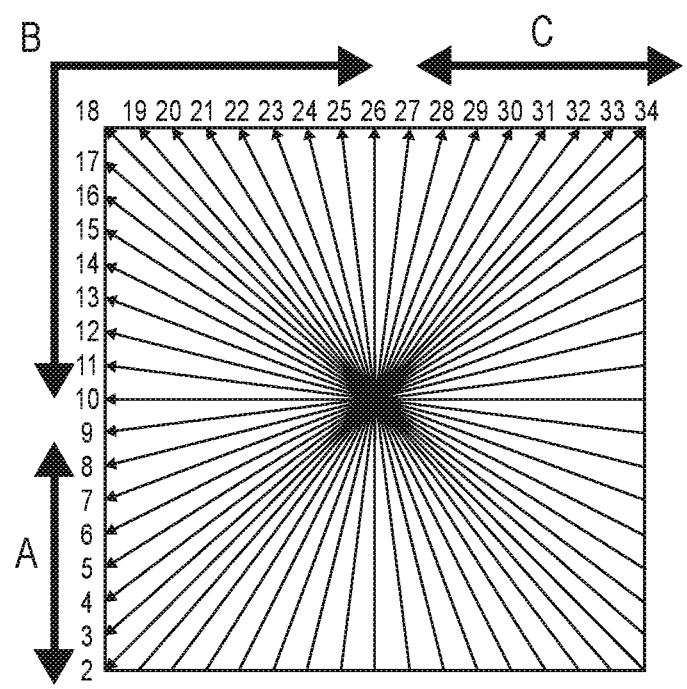
FIG. 4 is a diagram illustrating an example of the whole range of an intra-prediction mode to be used at the encoding device and the decoding device according to the first embodiment.

As illustrated in FIG. 4, 35 intra-prediction modes are categorized into A, B and C in accordance with directions to be referred. Note that while description will be provided using an example of the intra-prediction mode of the HEVC in the present embodiment, the present invention can also be applied to any encoding processing which performs intra-prediction using adjacent decoded reference pixels.

In the HEVC, a total of nine intra-prediction modes from a mode 2 to a mode 10 are categorized into a category A, a total of 15 intra-prediction modes from a mode 11 to a mode 25 are categorized into a category B, and a total of nine intra-prediction modes from a mode 26 to a mode 34 are categorized into a category C.

Note that in a system, or the like, other than the HEVC, modes which perform direction prediction among applicable intra-prediction modes are categorized such that intra-prediction modes which do not utilize a reference pixel located on an upper side are categorized into a category A, intra-prediction modes which do not utilize a reference pixel on a left side are categorized into a category C, and intra-prediction modes which utilize both the reference pixels on the upper side and on the left side are categorized into a category B.

The intra-prediction mode candidate generator 12 generates the intra-prediction mode candidates of the CUs to be encoded, based on the scanning order determined by the encoding processing order determiner 11.

For example, in a case where the encoding processing order determiner 11 determines the Z scanning as the scanning order, the intra-prediction mode candidate generator 12 sets three categories of A, B and C, a DC mode, and a Planar mode as the intra-prediction mode candidates which are selectable for the respective CUs in a similar manner to a case of the HEVC.

Meanwhile, in a case where the encoding processing order determiner 11 determines the reverse Z scanning as the encoding processing order, the intra-prediction mode candidate generator 12 sets the intra-prediction modes belonging to the category A, the DC mode, and the Planar mode as the intra-prediction mode candidate which are selectable for the respective CUs.

Further, in a case where the encoding processing order determiner 11 determines the N scanning as the scanning order, the intra-prediction mode candidate generator 12 sets the intra-prediction modes belonging to the category C, the DC mode, and the Planar mode as the intra-prediction mode candidates which are selectable for the respective CUs.

The intra-prediction mode determiner 13 determines the intra-prediction modes to be applied to the CUs to be encoded among the intra-prediction mode candidates generated by the intra-prediction mode candidate generator 12. For example, the intra-prediction mode determiner 13 determines the intra-prediction modes to be applied to the respective CUs among the intra-prediction modes belonging to the category determined by the intra-prediction mode candidate generator 12 through optimization, or the like, on the encoding device 1 side.

The intra predictor 14 performs intra-prediction processing on the CUs to be encoded, based on the scanning order determined by the encoding processing order determiner 11 and the intra-prediction modes determined by the intra-prediction mode determiner 13. Specifically, the intra predictor 14 performs intra-prediction processing on the CUs to be encoded in accordance with the intra-prediction modes to be applied to the respective CUs and positions of decoded reference pixels adjacent to the respective CUs.

An example of the intra-prediction processing according to the present embodiment will be described below with reference to FIG. 5A, FIG. 5B, FIG. 5C and FIG. 5D.

As described above, in a case where the encoding processing order determiner 11 determines the reverse Z scanning as the scanning order, the intra-prediction mode candidate generator 12 sets the intra-prediction modes belonging to the category A, the DC mode, and the Planar mode as the intra-prediction mode candidates which are selectable for the respective CUs.

Figure 5A:
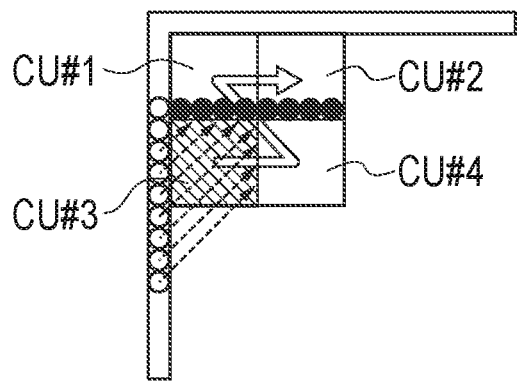
FIG. 5A is a diagram illustrating an example of intra-prediction processing at the encoding device and the decoding device according to the first embodiment.
Figure 5B:
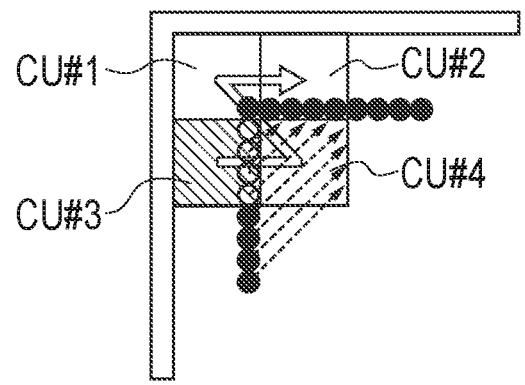
FIG. 5B is a diagram illustrating an example of intra-prediction processing at the encoding device and the decoding device according to the first embodiment.

As illustrated in FIG. 5A and FIG. 5B, the intra predictor 14 performs intra-prediction processing on the CU #3 (lower left CU) and the CU #4 (lower right CU) in a similar manner to the HEVC in related art. In the HEVC, in a case where intra-prediction processing is performed, by sequentially generating decoded images, the decoded images can be reutilized in intra-prediction processing at the CUs which are to be subsequently subjected to encoding processing.

Figure 5C:
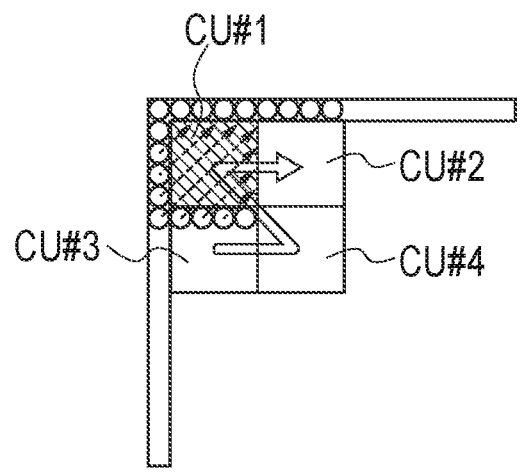
FIG. 5C is a diagram illustrating an example of intra-prediction processing at the encoding device and the decoding device according to the first embodiment.
Figure 5D:
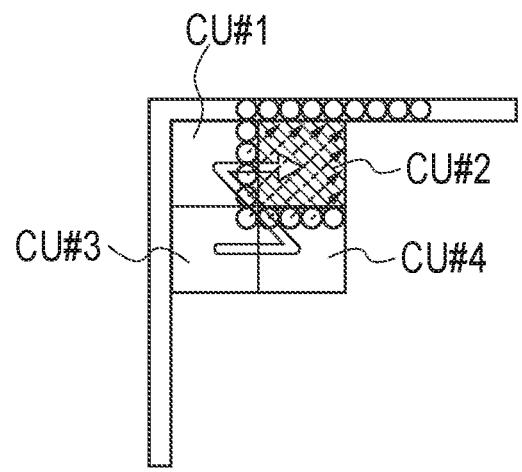
FIG. 5D is a diagram illustrating an example of intra-prediction processing at the encoding device and the decoding device according to the first embodiment.

Thus, as illustrated in FIG. 5C and FIG. 5D, when the intra predictor 14 performs intra-prediction on the CU #1 (upper left CU) and the CU #2 (upper right CU), the intra predictor 14 can reutilize decoded images of these CUs as reference pixels because the CUs located on the lower side (CU #3 and CU #4) have been decoded.

Thus, in a case where the scanning order of the respective CUs is the reverse Z scanning, the intra predictor 14 performs intra-prediction processing on the CUs whose lower side CUs have already been decoded, using at least reference pixels adjacent on the lower side and on the left side instead of performing intra-prediction processing which is normally performed in the HEVC.

In a similar manner, in a case where the scanning order of the respective CUs is the N scanning, the intra predictor 14 performs intra-prediction processing on the CUs whose right side CUs have already been decoded, using at least reference pixels adjacent on the right side and on the upper side instead of performing intra-prediction processing which is normally performed in the HEVC.

The entropy encoder 15 performs entropy encoding processing on the scanning order determined by the encoding processing order determiner 11 and the intra-prediction modes determined by the intra-prediction mode determiner 13. Specifically, as illustrated in FIG. 1, the entropy encoder 15 includes an encoding processing order encoder 151 and an intra-prediction mode encoder 152.

The encoding processing order encoder 151 performs entropy encoding processing on the scanning order determined by the encoding processing order determiner 11.

The intra-prediction mode encoder 152 performs entropy encoding processing on the intra-prediction modes based on the intra-prediction mode candidates generated by the intra-prediction mode candidate generator 12 and the intra-prediction modes determined by the intra-prediction mode determiner 13.

In the HEVC in related art, flag information of five bits is output as a stream for 32 intra-prediction modes obtained by excluding three intra-prediction modes registered in a most probable mode (MPM) in which intra-prediction modes are arranged in descending order of a probability of being selected, from 35 intra-prediction modes.

Further, in the HEVC in related art, the intra-prediction modes applied to upper and left blocks adjacent to the CUs to be encoded are registered as the MPM.

Meanwhile, in the present embodiment, in a case where it is determined by the intra-prediction mode candidate generator 12 that only the intra-prediction modes belonging to the category A, the DC mode and the Planar mode are selectable (that is, in a case where it is determined that the reverse Z scanning is applied to the CUs to be encoded), or in a case where it is determined by the intra-prediction mode candidate generator 12 that only the intra-prediction modes belonging to the category C, the DC mode and the Planar mode are selectable (that is, in a case where it is determined that the N scanning is applied to the CUs to be encoded), at the intra-prediction mode encoder 152, a total of 10 intra-prediction modes are likely to be selected. In this case, it is possible to employ a configuration where flag information of three bits is output as a stream for seven modes except three intra-prediction modes registered as the MPM. Such a configuration enables reduction in an amount of information necessary for encoding the intra-prediction modes, which improves encoding efficiency.

In the present embodiment, there is a case where blocks adjacent on the upper side and on the right side have been decoded as well as blocks on the upper side and on the left side of the CUs to be encoded. The intra-prediction mode encoder 152 therefore determines positions of the encoded CUs which are to be referred to so as to be registered in the MPM in accordance with the scanning order applied to the CUs to be encoded.

Specifically, the intra-prediction mode encoder 152 registers the intra-prediction modes applied to the encoded CUs located on the left side and on the upper side as the MPM in a case where the scanning order of the CUs to be encoded is the Z scanning order, registers the intra-prediction modes applied to the encoded CUs located on the left side and the lower side as the MPM in a case where the scanning order of the CUs to be encoded is the reverse Z scanning order, and registers the intra-prediction modes applied to the encoded CUs located on the right side and on the upper side as the MPM in a case where the scanning order of the CUs to be encoded is the N scanning order.

While a case has been described in the above-described example where the number of bits output as a stream is three bits in a case of fixed length coding, the number of bits output as a stream is not limited to three bits in a case where entropy encoding is performed using variable length coding, context-based adaptive binary arithmetic coding (CABAC), or the like.

Further, the decoding device 3 according to the present embodiment decodes an image of a frame unit constituting a moving image for each of divided CUs. Here, the decoding device 3 according to the present embodiment decodes blocks which are the image of the frame unit hierarchically quad-tree divided by the encoding device 1 according to the present embodiment.

Figure 6:
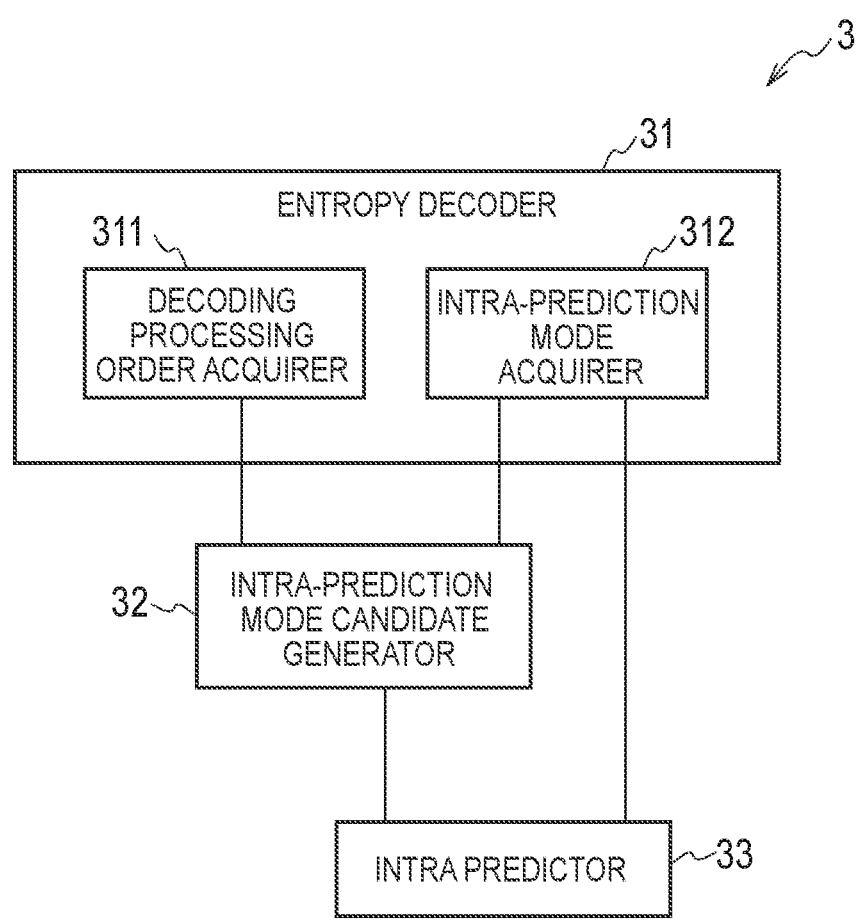
FIG. 6 is a diagram illustrating an example of a functional block configuration of the decoding device according to the first embodiment.

As illustrated in FIG. 6, the decoding device 3 according to the present embodiment includes an entropy decoder 31, an intra-prediction mode candidate generator 32, and an intra predictor 33.

The entropy decoder 31 acquires scanning order of CUs to be decoded by performing entropy decoding processing on the stream output from the encoding device 1. Specifically, the entropy decoder 31 includes a decoding processing order acquirer 311 and an intra-prediction mode acquirer 312.

The decoding processing order acquirer 311 acquires flag information indicating the scanning order for the respective CUs by performing entropy decoding processing on the stream output from the encoding device 1.

The intra-prediction mode candidate generator 32 generates intra-prediction mode candidates of the CUs to be decoded, based on the scanning order indicated by the flag information acquired by the decoding processing order acquirer 311.

Specifically, the intra-prediction mode candidate generator 32 generates intra-prediction mode candidates which are applicable to the respective CUs among the categories A, B and C illustrated in FIG. 4, the DC mode, and the Planar mode based on the scanning order to be applied to the respective CUs in a similar manner to the intra-prediction mode candidate generator 12 constituting the encoding device 1.

The intra-prediction mode acquirer 312 acquires the intra-prediction modes to be applied to the respective CUs by performing entropy decoding processing on the stream output from the encoding device 1 based on the intra-prediction mode candidates generated by the intra-prediction mode candidate generator 32.

The intra predictor 33 performs intra-prediction processing on the CUs to be decoded, based on the scanning order acquired by the decoding processing order acquirer 311 and the intra-prediction modes acquired by the intra-prediction mode acquirer 312. Specifically, the intra predictor 33 performs intra-prediction processing in accordance with the intra-prediction modes to be applied to the respective CUs and positions of decoded reference pixels adjacent to the respective CUs in a similar manner to the intra predictor 14 constituting the encoding device 1.

According to the encoding device 1 and the decoding device 3 according to the present embodiment, by the encoding device 1 controlling the scanning order, it is possible to improve intra-prediction efficiency, and further, reduce an information amount of intra-prediction modes to be transmitted based on scanning order to be applied, so that it is possible to improve encoding efficiency.

Modified Example of First Embodiment

An encoding device 1 and a decoding device 3 according to a modified example of the first embodiment of the present invention will be described below with reference to FIG. 7A, FIG. 7B, FIG. 7C and FIG. 7D focusing on a difference from the encoding device 1 and the decoding device 3 according to the first embodiment described above.

The encoding device 1 according to the modified example divides an original image of a frame unit constituting a moving image into CUs through hierarchical binary tree division and encodes the CUs.

While in the above-described first embodiment, determination of the scanning order, generation of the intra-prediction mode candidates, and entropy encoding processing on the intra-prediction modes and the scanning order for the CUs which are divided through quad-tree division have been described, in the present modified example, a case will be described where binary tree division is applied to the CUs.

In a case where binary tree division is applied to the CUs, it is possible to further select a division method from two types of a division method of dividing a CU into two vertically long CUs and a division method of dividing a CU into two horizontally long CUs.

Further, in a case where a CU is divided into two vertically long CUs, it is possible to select scanning order from two types of scanning order of horizontally forward scanning from the CU #1 (left CU) to the CU #2 (right CU) illustrated in FIG. 7A, and horizontally reverse scanning from the CU #2 (right CU) to the CU #1 (left CU) illustrated in FIG. 7B.

Meanwhile, in a case where a CU is divided into two horizontally long CUs, it is possible to select scanning order from two types of scanning order of vertically forward scanning from the CU #1 (upper CU) to the CU #2 (lower CU) illustrated in FIG. 7C and vertically reverse scanning from the CU #2 (lower CU) to the CU #1 (upper CU) illustrated in FIG. 7D.

The encoding processing order determiner 11 determines which of the horizontally forward scanning and the horizontally reverse scanning is applied as scanning order in a case where a CU is divided into two vertically long CUs.

Meanwhile, the encoding processing order determiner 11 determines which of the vertically forward scanning and the vertically reverse scanning is applied as scanning order in a case where a CU is divided into two horizontally long CUs.

The intra-prediction mode candidate generator 12 generates intra-prediction mode candidates which are applicable to the respective CUs based on the scanning order determined by the encoding processing order determiner 11.

The intra-prediction processing according to the present modified example will be described below.

In a case where the encoding processing order determiner 11 determines the horizontally forward scanning or the vertically forward scanning as the scanning order, the intra-prediction mode candidate generator 12 sets three categories A, B and C, the DC mode, and the Planar mode as the intra-prediction mode candidates which are selectable for the respective CUs (that is, in similar to the intra-prediction mode candidates in the HEVC).

Meanwhile, in a case where the encoding processing order determiner 11 determines the horizontally reverse scanning as the scanning order, the intra-prediction mode candidate generator 12 sets the intra-prediction modes belonging to the category C, the DC mode, and the Planar mode as the intra-prediction mode candidates which are selectable for the respective CUs.

Further, in a case where the encoding processing order determiner 11 determines the vertically reverse scanning order as the scanning order, the intra-prediction mode candidate generator 12 sets the intra-prediction modes belonging to the category A, the DC mode, and the Planar mode as the intra-prediction mode candidates which are selectable for the respective CUs.

Note that while a case of hierarchical quad-tree division has been described in the above-described first embodiment, and a case of hierarchical binary tree division has been described in the present modified example, the present invention can also be applied to an encoding system which supports selection of both types of hierarchical division by switching division in accordance with which of quad-tree division and binary tree division is selected for respective CUs. In other words, the CUs to be encoded may be able to be obtained by hierarchically applying at least one of quad-tree division or binary tree division to an original image.

Second Embodiment

An encoding device 1 and a decoding device 3 according to a second embodiment of the present invention will be described below with reference to FIG. 8 to FIG. 10 and Table 1, focusing on a difference from the encoding device 1 and the decoding device 3 according to the first embodiment described above.

The encoding device 1 according to the present embodiment divides an original image of a frame unit constituting a moving image into CUs through hierarchical quad-tree division and encodes the CUs.

In the above-described first embodiment, the encoding processing order determiner 11 determines which scanning order among three types of scanning order of the Z scanning, the reverse Z scanning and the N scanning is applied to the CUs which are quad-tree divided, and the encoding processing order encoder 151 entropy encodes the determined scanning order.

Meanwhile, the encoding processing order determiner 11 according to the present embodiment generates processing order candidates which are scanning order selectable for child CUs (child blocks) obtained by quad-tree dividing the CU, based on information indicating whether or not respective blocks adjacent on the upper side, on the lower side, on the left side and on the right side of the CUs to be encoded have been encoded and determines which scanning order among the generated processing order candidates is to be applied. Further, the encoding processing order encoder 151 according to the present embodiment entropy encodes the scanning order determined by the encoding processing order determiner 11.

Figure 8:
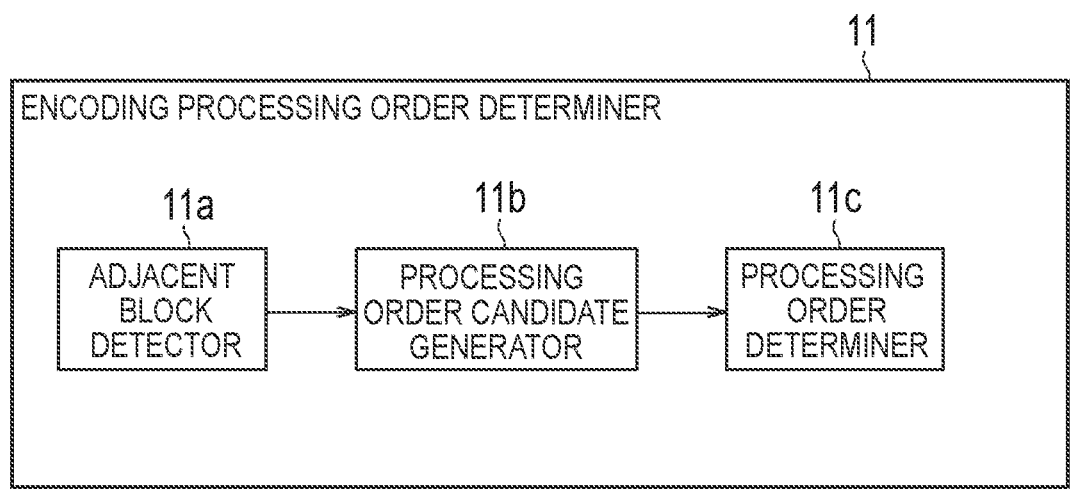
FIG. 8 is a diagram illustrating an example of a functional block configuration of an encoding processing order determiner at an encoding device according to a second embodiment.

FIG. 8 illustrates an example of a functional block configuration of the encoding processing order determiner 11 according to the present embodiment. As illustrated in FIG. 8, the encoding processing order determiner 11 according to the present embodiment includes an adjacent block detector 11a, a processing order candidate generator 11b, and a processing order determiner 11c.

The adjacent block detector 11a detects whether or not blocks located on the upper side, on the lower side, on the left side and on the right side of the CUs to be encoded have been encoded and outputs available_block flags to the processing order candidate generator 11b based on the detection result. FIG. 9 illustrates an example of operation of the adjacent block detector 11a according to the present embodiment. FIG. 9 indicates positions corresponding to the encoded adjacent blocks with solid lines in the CUs to be encoded.

Figure 9:
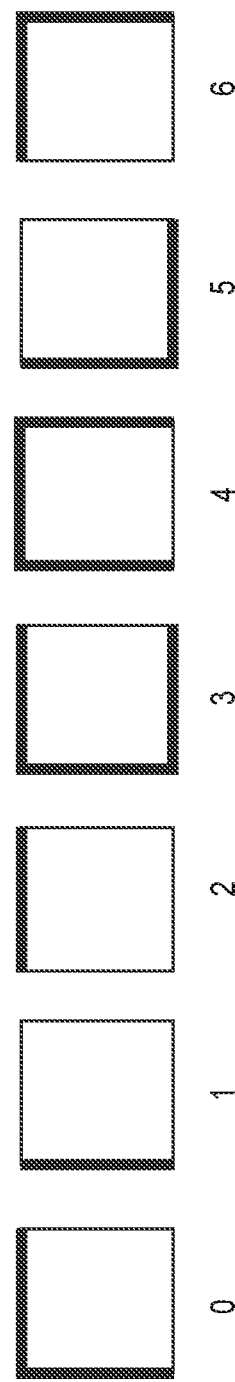
FIG. 9 is a diagram illustrating an example of operation of an adjacent block detector according to the second embodiment.

As illustrated in FIG. 9, the adjacent block detector 11a outputs the available_block flag as 0 in a case where only the blocks on the left side and on the upper side of the CU to be encoded have been encoded (in a similar manner to the HEVC in related art). The adjacent block detector 11a outputs the available_block flag as 1 in a case where only the block on the left side of the CU has been encoded. The adjacent block detector 11a outputs the available_block flag as 2 in a case where only the block on the upper side of the CU has been encoded. The adjacent block detector 11a outputs the available_block flag as 3 in a case where only the blocks on the upper side, on the left side and on the lower side of the CU have been encoded. The adjacent block detector 11a outputs the available_block flag as 4 in a case where only the blocks on the upper side, on the left side and on the right side of the CU have been encoded. The adjacent block detector 11a outputs the available_block flag as 5 in a case where only the blocks on the left side and on the lower side of the CU have been encoded. The adjacent block detector 11a outputs the available_block flag as 6 in a case where only the blocks on the upper side and on the right side of the CU have been encoded.

The processing order candidate generator 11b generates processing order candidates which are candidates for selectable scanning order in a case where the CUs to be encoded are further quad-tree divided, based on the available_block flags output from the adjacent block detector 11a.

Specifically, as illustrated in Table 1, in a case where the available_block flag output from the adjacent block detector 11a is 0, the processing order candidate generator 11b outputs the Z scanning, the reverse Z scanning and the N scanning to the processing order determiner 11c as the processing order candidates. In a case where the available_block flag is 1, the processing order candidate generator 11b outputs the Z scanning and the reverse Z scanning to the processing order determiner 11c as the processing order candidates. In a case where the available_block flag is 2, the processing order candidate generator 11b outputs the Z scanning and the N scanning to the processing order determiner 11c as the processing order candidates. In a case where the available_block flag is 3, the processing order candidate generator 11b outputs the Z scanning and the reverse Z scanning to the processing order determiner 11c as the processing order candidates. In a case where the available_block flag is 4, the processing order candidate generator 11b outputs the Z scanning and the N scanning to the processing order determiner 11c as the processing order candidates. In a case where the available_block flag is 5, the processing order candidate generator 11b outputs the Z scanning and the reverse Z scanning to the processing order determiner 11c as the processing order candidates. In a case where the available_block flag is 6, the processing order candidate generator 11b outputs the Z scanning and the N scanning to the processing order determiner 11c as the processing order candidates.

TABLE 1

| available_block | Z scanning | Reverse Z scanning | N scanning |
|---|---|---|---|
| 0 | ○ | ○ | ○ |
| 1 | ○ | ○ | X |
| 2 | ○ | X | ○ |
| 3 | ○ | ○ | X |
| 4 | ○ | X | ○ |
| 5 | ○ | ○ | X |
| 6 | ○ | X | ○ |

However, the processing order which is selectable in accordance with the available_block flag is not limited to the examples illustrated in Table 1 if the processing order is defined in advance at the encoding device 1 and the decoding device 3.

The processing order determiner 11c determines which scanning order is to be applied among the processing order candidates the generated by the processing order candidate generator 11b.

Further, the encoding processing order encoder 151 according to the present embodiment entropy encodes the scanning order determined by the encoding processing order determiner 11 (processing order determiner 11c) based on the processing order candidates output from the processing order candidate generator 11b.

Specifically, in a case where the processing order candidate generator 11b outputs three types of processing order candidates, the encoding processing order encoder 151 first entropy encodes a flag Zscan_flag indicating whether or not the scanning order is the Z scanning order. In a case where the scanning order of the divided CUs to be encoded (child CUs) is the Z scanning order, the encoding processing order encoder 151 performs entropy encoding while setting 1 at the Zscan_flag and finishes the processing. Meanwhile, in a case where the scanning order of the divided CUs to be encoded is not the Z scanning order, the encoding processing order encoder 151 performs entropy encoding while setting 0 at the Zscan_flag and further entropy encodes a scan_mode_flag flag indicating which of the reverse Z scanning and the N scanning is to be applied as scanning order.

Meanwhile, in a case where the processing order candidate generator 11b outputs two types of processing order candidates, the encoding processing order encoder 151 entropy encodes only the Zscan_flag indicating whether or not the scanning order is the Z scanning order. In a case where the scanning order of the divided CUs to be encoded is the Z scanning order, the encoding processing order encoder 151 performs entropy encoding while setting 1 at the Zscan_flag and finishes the processing. Meanwhile, also in a case where the scanning order of the divided CUs to be encoded is not the Z scanning order, the encoding processing order encoder 151 can uniquely determine scanning order to be applied, and thus, the encoding processing order encoder 151 finishes the processing without entropy encoding scan_mode_flag.

Figure 10:
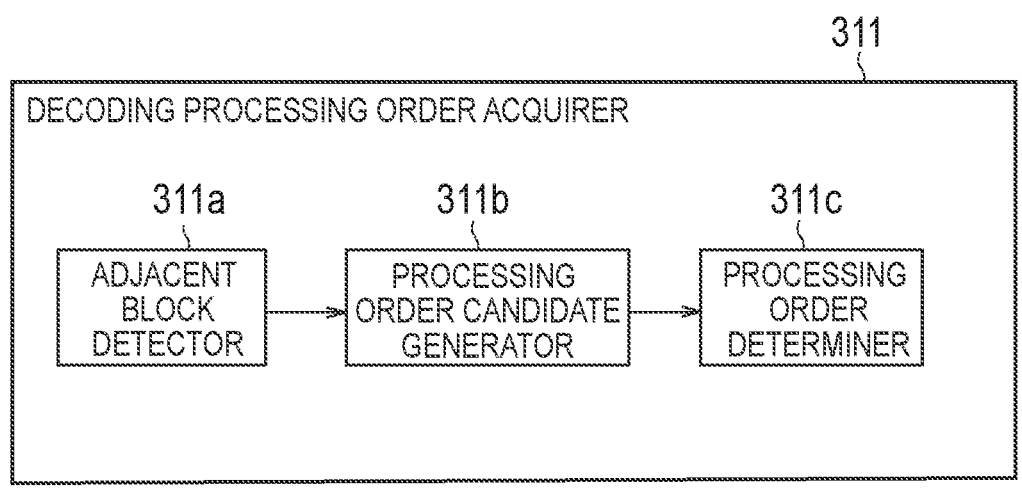
FIG. 10 is a diagram illustrating an example of a functional block configuration of a decoding processing order acquirer at a decoding device according to the second embodiment.

FIG. 10 illustrates an example of a functional block configuration of the decoding processing order acquirer 311 at the decoding device 3 according to the present embodiment. The decoding processing order acquirer 311 acquires flag information indicating scanning order for the respective CUs by performing entropy decoding processing on the stream output from the encoding device 1.

Specifically, as illustrated in FIG. 10, the decoding processing order acquirer 311 includes an adjacent block detector 311a, a processing order candidate generator 311b, and a processing order determiner 311c.

The adjacent block detector 311a detects whether or not blocks located on the upper side, on the lower side, on the left side and on the right side of the CUs to be decoded have been decoded and outputs the available_block flags to the processing order candidate generator 311b based on the detection result (see FIG. 9).

The processing order candidate generator 311b generates processing order candidates which are candidates for scanning order selectable for the divided CUs to be decoded (child CUs) based on the available_block flags output from the adjacent block detector 311a (see Table 1).

The processing order determiner 311c determines which scanning order among the processing order candidates is to be applied based on the processing order candidates generated by the processing order candidate generator 311b and the flag information transmitted from the encoding device 1.

Specifically, in a case where the processing order candidate generator 311b outputs three types of processing order candidates, the processing order determiner 311c first decodes a flag Zscan_flag indicating whether or not the scanning order is the Z scanning order. In a case where the Zscan_flag is 1, the processing order determiner 311c determines that the scanning order of the divided CUs to be decoded (child CUs) is the Z scanning order. Meanwhile, in a case where the Zscan_flag is 0, the processing order determiner 311c further decodes a scan_mode_flag flag indicating which of the reverse Z scanning and the N scanning is to be applied as the scanning order.

Meanwhile, in a case where the processing order candidate generator 311b outputs two types of processing order candidates, the processing order determiner 311c decodes only the Zscan_flag indicating whether or not the scanning order is the Z scanning order. In a case where the Zscan_flag is 1, the processing order determiner 311c determines that the scanning order of the divided CUs to be decoded (child CUs) is the Z scanning order. Meanwhile, in a case where the Zscan_flag is 0, the processing order determiner 311c can uniquely determine the scanning order to be applied, and thus, the processing order determiner 311c finishes the processing without decoding the scan_mode_flag.

According to the encoding device 1 and the decoding device 3 according to the present embodiment, by the encoding device 1 controlling the scanning order based on information indicating whether or not peripheral blocks have been encoded, it is possible to improve intra-prediction efficiency. Further, it is possible to reduce an amount of information of scanning order and an amount of information of the intra-prediction mode which are to be transmitted, so that it is possible to improve encoding efficiency.

Modified Example of Second Embodiment

An encoding device 1 and a decoding device 3 according to a modified example of the second embodiment of the present invention will be described below with reference to Table 2, focusing on a difference from the encoding device 1 and the decoding device 3 according to the above-described second embodiment.

The encoding device 1 according to the present modified example divides an original image of a frame unit constituting a moving image into CUs through hierarchical binary tree division and encodes the CUs.

While determination of the scanning order, generation of the intra-prediction mode candidates, and entropy encoding processing on the intra-prediction modes and the scanning order for the CUs divided through quad-tree division have been described in the above-described second embodiment, a case where binary tree division is applied to the CUs will be described in the present modified example.

In a case where binary tree division is applied to the CUs, it is possible to further select a division method from two types of a division method of dividing the CU into two vertically long CUs and a division method of dividing the CU into two horizontally long CUs.

Further, in a case where the CU is divided into two vertically long CUs, it is possible to select scanning order from two types of horizontally forward scanning from the CU #1 (left CU) to the CU #2 (right CU) illustrated in FIG. 7A and horizontally reverse scanning from the CU #2 (right CU) to the CU #1 (left CU) illustrated in FIG. 7B.

Meanwhile, in a case where the CU is divided into two horizontally long CUs, it is possible to select scanning order from two types of vertically forward scanning from the CU #1 (upper CU) to the CU #2 (lower CU) illustrated in FIG. 7C and vertically reverse scanning from the CU #2 (lower CU) to the CU #1 (upper CU) illustrated in FIG. 7D.

In the present modified example, the adjacent block detector 11a illustrated in FIG. 8 detects whether or not blocks adjacent on the upper side, on the lower side, on the left side and on the right side of the CUs to be encoded have been encoded and outputs available_block flags to the processing order candidate generator 11b based on the detection result (see FIG. 9).

The processing order candidate generator 11b generates processing order candidates as indicated in Table 2 based on the available_block flags output from the adjacent block detector 11a and outputs the generated processing order candidates to the processing order determiner 11c. However, the processing order which is selectable based on the available_block flags is not limited to the examples indicated in Table 2 if the selectable processing order is defined in advance at the encoding device 1 and the decoding device 3.

TABLE 2

| available_block | Binary tree division into vertically long CUs | | Binary tree division into horizontally long CUs | |
|---|---|---|---|---|
| | Horizontally forward scanning | Horizontally reverse scanning | Vertically forward scanning | Vertically reverse scanning |
| 0 | O | O | O | O |
| 1 | O | X | O | X |
| 2 | O | O | O | O |
| 3 | O | X | O | X |
| 4 | O | O | O | O |
| 5 | O | X | O | X |
| 6 | O | O | O | O |

Specifically, in a case where the CU to be encoded is binary tree divided into two vertically long CUs, the processing order candidate generator 11b generates processing order candidates as follows. In a case where the available_block flag is one of 0, 2, 4 and 6, the processing order candidate generator 11b generates horizontally forward scanning and horizontally reverse scanning as the processing order candidates, and in a case where the available_block flag is one of 1, 3 and 5, the processing order candidate generator 11b generates only horizontally forward scanning as the candidate for the processing order.

Meanwhile, in a case where the CU to be encoded is binary tree divided into two horizontally long CUs, the processing order candidate generator 11b generates processing order candidates as follows. In a case where the available_block flag is one of 0, 2, 4 and 6, the processing order candidate generator 11b generates vertically forward scanning and vertically reverse scanning as the processing order candidates, and in a case where the available_block flag is one of 1, 3 and 5, the processing order candidate generator 11b generates only vertically forward scanning as the candidate for the processing order.

The processing order determiner 11c determines which scanning order is to be applied from the processing order candidates generated by the processing order candidate generator 11b and outputs the determined scanning order to the encoding processing order encoder 151.

The encoding processing order encoder 151 entropy encodes the scanning order determined by the encoding processing order determiner 11 (processing order determiner 11c) based on the processing order candidates output from the processing order candidate generator 11b.

Specifically, in a case where the processing order candidate generator 11b outputs two types of processing order candidates, the encoding processing order encoder 151 entropy encodes a flag scan_flag indicating whether or not the encoding processing order is the forward scanning. In a case where the encoding processing order of the divided CUs to be encoded is forward scanning, the encoding processing order encoder 151 performs entropy encoding while setting 1 at the scan_flag and finishes the processing. Meanwhile, in a case where the encoding processing order of the divided CUs to be encoded is not the forward scanning (in a case where the encoding processing order is the reverse scanning), the encoding processing order encoder 151 performs entropy encoding while setting 0 at the scan_flag and finishes the processing.

Meanwhile, in a case where the processing order candidate generator 11b outputs one type of candidate for the processing order, it is not necessary to transmit a flag indicating the scanning order to be applied, and thus, the encoding processing order encoder 151 finishes the processing without entropy encoding the scan_flag.

At the decoding device 3 according to the present modified example, the adjacent block detector 311a illustrated in FIG. 10 detects whether or not blocks located on the upper side, on the lower side, on the left side and on the right side of the CUs to be decoded have been decoded, and outputs available_block flags to the processing order candidate generator 311b based on the detection result (see FIG. 9).

The processing order candidate generator 311b generates processing order candidates which are candidates for scanning order which are selectable for the divided CUs to be decoded (child CUs) based on the available_block flags output from the adjacent block detector 311a (see Table 2).

The processing order determiner 311c determines which scanning order is to be applied from the processing order candidates based on the processing order candidates generated by the processing order candidate generator 311b and the flag information transmitted from the encoding device 1.

Specifically, in a case where the processing order candidate generator 311b outputs two types of processing order candidates, the processing order determiner 311c decodes a flag scan_flag indicating whether or not the scanning order is the forward scanning. The processing order determiner 311c determines that the scanning order of the divided CUs to be decoded (child CUs) is the forward scanning in a case where the scan_flag is 1 and determines that the scanning order of the divided CUs to be decoded (child CUs) is the reverse scanning in a case where the scan_flag is 0.

Meanwhile, in a case where the processing order candidate generator 311b outputs one type of candidate for the processing order, the processing order determiner 311c finishes the processing without decoding the scan_flag.

According to the encoding device 1 and the decoding device 3 according to the present modified example, by the encoding device 1 controlling the scanning order based on information indicating whether or not peripheral blocks have been encoded, it is possible to improve intra-prediction efficiency and reduce an amount of information of the scanning order and an amount of information of the intra-prediction mode which are to be transmitted, so that it is possible to improve encoding efficiency.

Third Embodiment

An encoding device 1 and a decoding device 3 according to a third embodiment of the present invention will be described below with reference to FIG. 11 to FIG. 13 and Table 3, focusing on a difference from the encoding device 1 and the decoding device 3 according to the second embodiment described above.

The encoding device 1 according to the present embodiment divides an original image of a frame unit constituting a moving image into CUs through hierarchical quad-tree division and encodes the CUs.

In the above-described second embodiment, the processing order candidate generator 11b generates processing order candidates indicating which scanning order is selectable among three types of scanning order of the Z scanning, the reverse Z scanning and the N scanning in accordance with whether or not blocks adjacent on the upper side, on the lower side, on the left side and on the right side of the CUs which are divided through quad-tree division have been encoded, the processing order determiner 11c determines which scanning order is to be applied among the generated processing order candidates, and the intra-prediction mode candidate generator 12 determines intra-prediction mode candidates which are applicable to the respective divided CUs (child CUs) based on the determined scanning order.

Meanwhile, the encoding device 1 according to the present embodiment determines intra-prediction mode candidates which are applicable to the respective divided CUs based on information indicating whether or not respective blocks adjacent on the upper side, on the lower side, on the left side and on the right side of the respective CUs which are divided through quad-tree division have been encoded, and the scanning order to be applied.

Figure 11:
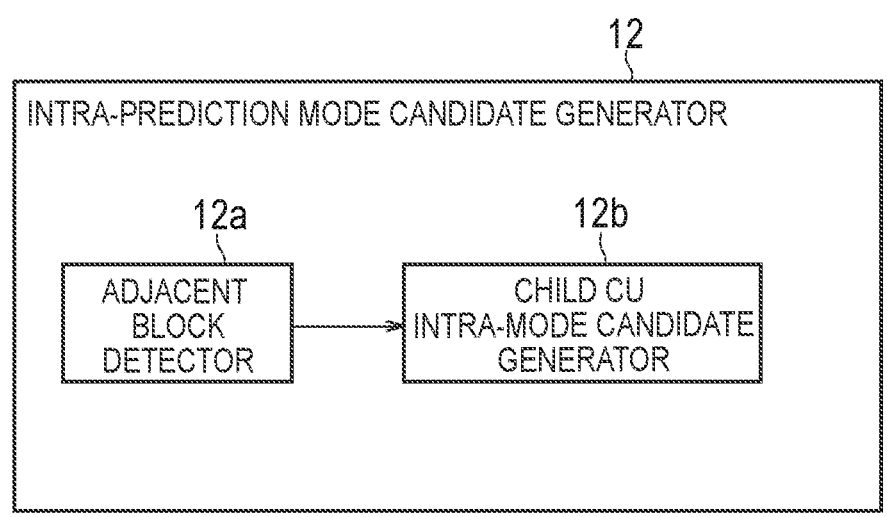
FIG. 11 is a diagram illustrating an example of a functional block configuration of an intra-prediction mode candidate generator at an encoding device according to a third embodiment.

Specifically, at the encoding device 1 according to the present embodiment, the intra-prediction mode candidate generator 12 includes an adjacent block detector 12a, and a child CU intra-mode candidate generator 12b as illustrated in FIG. 11.

The adjacent block detector 12a performs processing similar to that performed by the adjacent block detector 11a in the above-described second embodiment. However, while the adjacent block detector 11a in the second embodiment outputs the available_block flags indicating whether or not blocks located on the upper side, on the lower side, on the left side and on the right side of the CUs to be encoded have been encoded, the adjacent block detector 12a in the present embodiment outputs the available_block flags indicating whether or not adjacent blocks of respective CUs (child CUs) obtained by further quad-tree dividing the CU have been encoded.

The child CU intra-mode candidate generator 12b generates intra-prediction mode candidates which are selectable by the respective divided child CUs based on the scanning order to be applied and the available_block flags input from the adjacent block detector 12a in a case where the CUs to be encoded are further quad-tree divided.

Here, operation of the child CU intra-mode candidate generator 12b will be described using FIG. 4, FIG. 12A, FIG. 12B and Table 3.

In the HEVC, as illustrated in FIG. 4, direction prediction from a lower left direction to an upper right direction is allocated to a total of 33 modes from a mode 2 to a mode 34 as direction prediction of intra-prediction. In the first embodiment, such a total of 33 modes are classified into a total of three categories of categories A, B and C, and the intra-prediction modes corresponding to at least one or more categories among A, B and C, the DC mode, and the Planar mode are generated as the applicable intra-prediction mode candidates in accordance with the scanning order determined by the encoding processing order determiner 11.

Figure 12A:
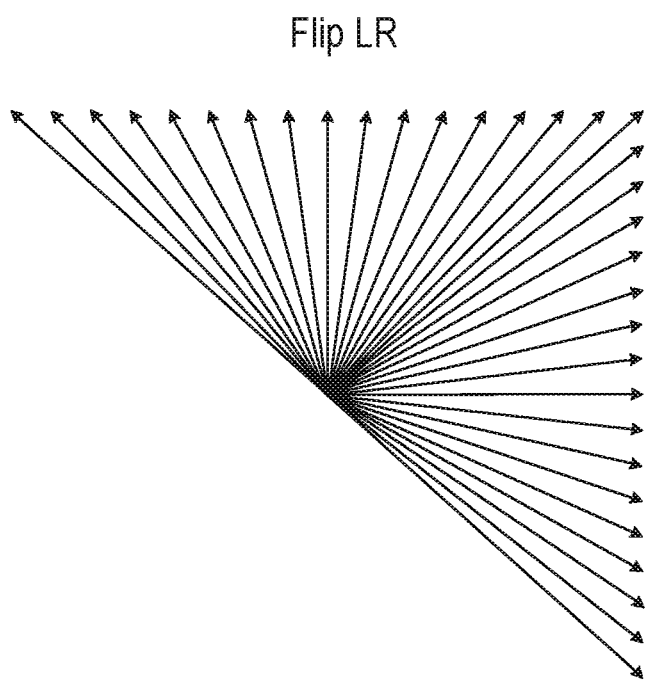
FIG. 12A is a diagram illustrating an example of an intra-prediction mode to be used at the encoding device and a decoding device according to the third embodiment.
Figure 12B:
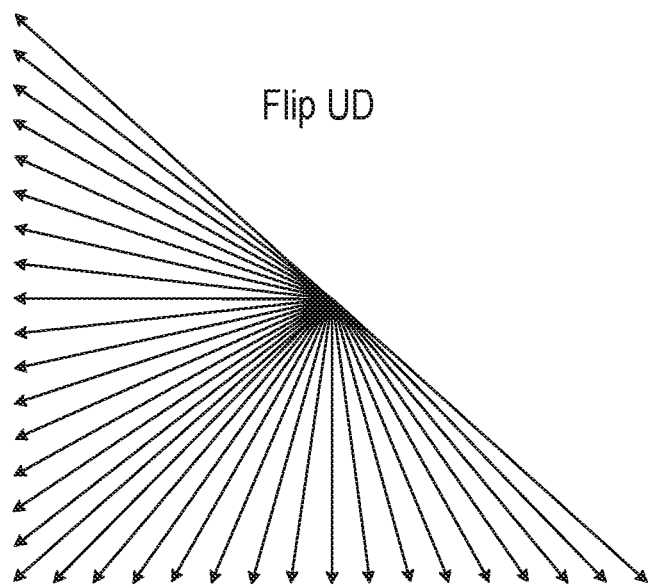
FIG. 12B is a diagram illustrating an example of an intra-prediction mode to be used at the encoding device and a decoding device according to the third embodiment.

Meanwhile, the child CU intra-mode candidate generator 12b according to the present embodiment generates the intra-prediction modes corresponding to at least one or more categories among a FlipLR category allocated to a total of 33 modes clockwise from the upper left direction to the lower right direction as illustrated in FIG. 12A, and a FlipUD category allocated to a total of 33 modes counterclockwise from the upper left direction to the lower right direction as illustrated in FIG. 12B, in addition to the category A, the category B and the category C, and the DC mode and the Planar mode as applicable intra-prediction mode candidates.

Note that while the FlipLR category and the FlipUD category have the same number of modes which are applicable in the HEVC, the prediction directions are different from those in the HEVC. The intra-prediction modes indicating prediction directions may be allocated in any way if allocation of the intra-prediction modes is defined in advance at the encoding device 1 and the decoding device 3.

Specifically, in a case where the CUs to be encoded are further quad-tree divided, the child CU intra-mode candidate generator 12b generates the intra-prediction modes corresponding to the category defined in advance, the DC mode and the Planar mode as intra-prediction mode candidates which are selectable for the respective divided child CUs based on the available_block flags of the child CUs input from the adjacent block detector 12a and the scanning order of the CUs determined by the encoding processing order determiner 11.

As indicated in Table 3, in a case where the CUs are quad-tree divided, the child CU intra-mode candidate generator 12b generates applicable intra-prediction mode candidates for the respective child CUs in accordance with the scanning order of the divided child CUs and whether or not blocks adjacent on the upper side, on the lower side, on the left side and on the right side of each of the divided child CUs have been decoded.

TABLE 3

| available_block | Z scanning | Reverse Z scanning | N scanning |
| --- | --- | --- | --- |
| 0 | A, B, C | — | — |
| 1 | A, B | A | — |
| 2 | B, C | — | C |
| 3 | A, B, C | FlipUD | — |
| 4 | A, B, C | — | FilipLR |
| 5 | — | FlipUD | — |
| 6 | — | — | FilipLR |

For example, in a case where "B, C" are described in Table 3 as categories of applicable intra-prediction mode candidates, the intra-prediction mode candidates include the intra-prediction modes included in the category B and the category C, the DC mode and the Planar mode. Further, in a case where "FlipLR" is described, the intra-prediction mode candidates include intra-prediction modes of prediction directions from the upper left direction to the lower right direction allocated clockwise to a total of 33 modes, the DC mode and the Planar mode.

Note that "-" in Table 3 indicates that a CU in such a state does not exist. For example, in a case where the CUs are quad-tree divided, and in a case where the divided child CUs are subjected to encoding processing in the reverse Z scanning order, blocks adjacent on the upper side of two child CUs located on the lower side among the divided child CUs are always blocks which have not been encoded, there is no possibility that the available_block flags become 0. Further, blocks adjacent on the lower side of two child CUs located on the upper side are always blocks which have been encoded, there is no possibility that the available_block flags become 0.

Further, at the decoding device 3 according to the present embodiment, the intra-prediction mode candidate generator 32 is constituted in a similar manner to the intra-prediction mode candidate generator 12 of the encoding device 1. Specifically, the intra-prediction mode candidate generator 32 includes an adjacent block detector 32a and a child CU intra-mode candidate generator 32b as illustrated in FIG. 13.

The adjacent block detector 32a outputs available_block flags indicating whether or not adjacent blocks of each of the CUs (child CUs) obtained by further quad-tree dividing the CUs to be decoded have been decoded.

In a case where the CUs to be decoded are further quad-tree divided, the child CU intra-mode candidate generator 32b generates intra-prediction mode candidates which are selectable for the respective divided child CUs based on the scanning order to be applied and the available_block flags input from the adjacent block detector 32a (see Table 3).

According to the encoding device 1 and the decoding device 3 according to the present embodiment, by the encoding device 1 controlling the scanning order and the applicable intra-prediction mode candidates based on information indicating whether or not peripheral blocks have been encoded, it is possible to improve intra-prediction efficiency and reduce an amount of information of the scanning order and an amount of information of the intra-prediction modes which are to be transmitted, so that it is possible to improve encoding efficiency.

Modified Example of Third Embodiment

An encoding device 1 and a decoding device 3 according to a modified example of the third embodiment of the present invention will be described below with reference to Table 4, focusing on a difference from the encoding device 1 and the decoding device 3 according to the third embodiment described above.

The encoding device 1 according to the present modified example divides an original image of a frame unit constituting a moving image into CUs through hierarchical binary tree division and encodes the CUs.

While in the above-described third embodiment, determination of the scanning order, generation of the intra-prediction mode candidates, and entropy encoding processing on the intra-prediction modes and the scanning order for CUs which are divided through quad-tree division have been described, a case where binary tree division is applied to the CUs will be described in the present modified example.

In a case where binary tree division is applied to the CUs, it is possible to further select a division method from two types of a division method of dividing a CU into two vertically long CUs and a division method of dividing a CU into two horizontally long CUs.

Further, in a case where a CU is divided into two vertically long CUs, it is possible to select scanning order from two types of horizontally forward scanning from the CU #1 (left CU) to the CU #2 (right CU) illustrated in FIG. 7A and horizontally reverse scanning from the CU #2 (right CU) to the CU #1 (left CU) illustrated in FIG. 7B.

Meanwhile, in a case where a CU is divided into two horizontally long CUs, it is possible to select scanning order from two types of vertically forward scanning from the CU #1 (upper CU) to the CU #2 (lower CU) illustrated in FIG. 7C and vertically reverse scanning from the CU #2 (lower CU) to the CU #1 (upper CU) illustrated in FIG. 7D.

In the present modified example, the adjacent block detector 12a illustrated in FIG. 10 outputs available_block flags indicating whether or not adjacent blocks of each of the CUs (child CUs) obtained by further binary-tree dividing the CUs to be encoded have been encoded.

The child CU intra-mode candidate generator 12b generates intra-prediction mode candidates which are selectable for the respective divided child CUs based on the scanning order to be applied and the available_block flags input from the adjacent block detector 12a in a case where the CUs to be encoded are further binary-tree divided.

As indicated in Table 4, in a case where the CUs are binary-tree divided, the child CU intra-mode candidate generator 12b generates intra-prediction mode candidates which are applicable to the respective child CUs in accordance with the scanning order of the divided child CUs and whether or not blocks adjacent on the upper side, on the lower side, on the left side and on the right side of each of the divided child CUs have been decoded.

TABLE 4

| available_block | Binary tree division into vertically long CUs | | Binary tree division into horizontally long CUs | |
| --- | --- | --- | --- | --- |
| | Horizontally forward scanning | Horizontally reverse scanning | Vertically forward scanning | Vertically reverse scanning |
| 0 | A, B, C | — | A, B, C | — |
| 1 | A, B | — | A, B | A |
| 2 | B, C | C | B, C | — |
| 3 | A, B, C | — | A, B, C | FlipUD |
| 4 | A, B, C | FlipLR | A, B, C | — |
| 5 | FilipUD | — | — | FlipUD |
| 6 | — | FlipLR | FlipLR | — |

For example, in a case where "B, C" are described in categories of applicable intra-prediction mode candidates in Table 4, the intra-prediction mode candidates include intra-prediction modes included in the category B and the category C, the DC mode, and the Planar mode. Further, in a case where "FlipLR" is described, the intra-prediction mode candidates include intra-prediction modes of prediction directions from the upper left direction to the lower right direction allocated clockwise to a total of 33 modes, the DC mode, and the Planar mode.

Note that "-" in Table 4 indicates that a CU in such a state does not exist. For example, in a case where the CUs are binary-tree divided into two horizontally long CUs, in a case where the divided child CUs are subjected to encoding processing in the vertically reverse scanning order, a block adjacent on the upper side of the child CU located on the lower side among the divided child CUs is always a block which has not been encoded, and thus, there is no possibility that the available_block flag becomes 0. Further, a block adjacent on the lower side of the child CU located on the upper side is always a block which has been encoded, and thus, there is no possibility that the available_block flag becomes 0.

Figure 13:
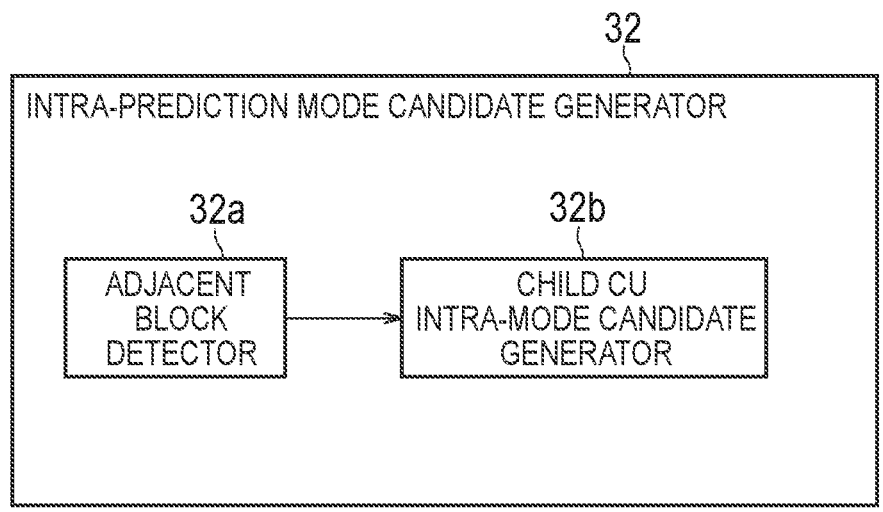
FIG. 13 is a diagram illustrating an example of a functional block configuration of an intra-prediction mode candidate generator at the decoding device according to the third embodiment.
Figure 14:
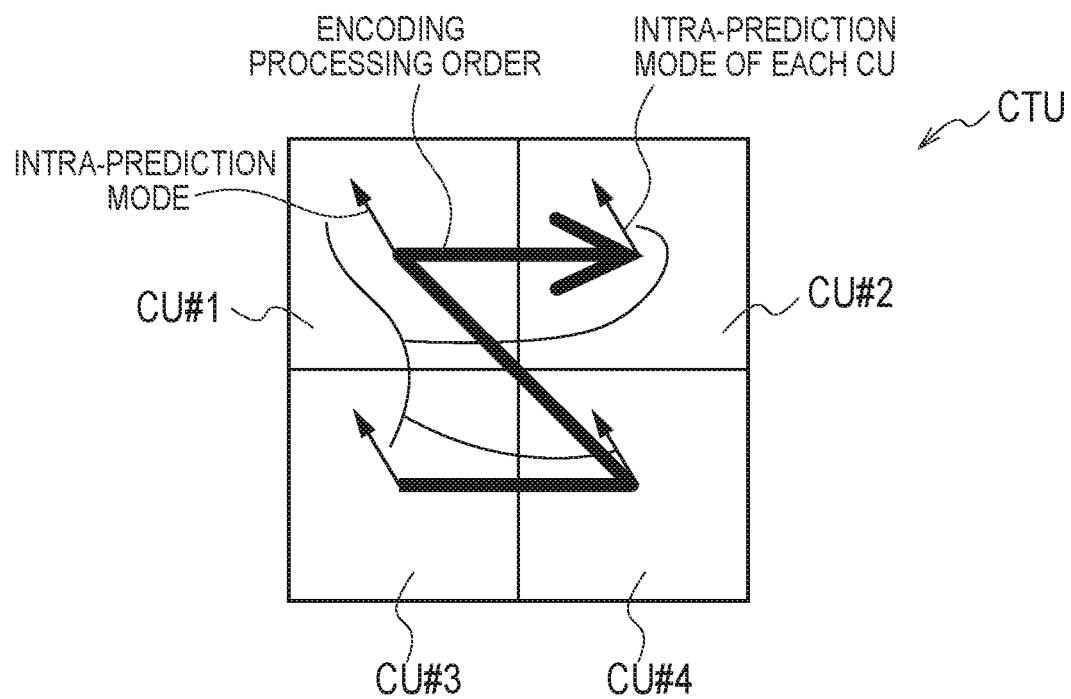
FIG. 14 is a diagram for explaining related art.

Further, at the decoding device 3 according to the present modified example, the adjacent block detector 32a illustrated in FIG. 13 outputs available_block flags indicating whether or not adjacent blocks of each of the respective CUs (child CUs) obtained by further binary-tree dividing the CUs to be decoded have been decoded.

The child CU intra-mode candidate generator 32b generates intra-prediction mode which are selectable for the respective divided child CUs based on the scanning order to be applied and the available_block flags input from the adjacent block detector 32a in a case where the CUs to be decoded are further binary-tree divided (see Table 4).

According to the encoding device 1 and the decoding device 3 according to the present modified example, by the encoding device 1 controlling the scanning order and the applicable intra-prediction mode candidates based on information indicating whether or not peripheral blocks have been encoded, it is possible to improve intra-prediction efficiency and reduce an amount of information of scanning order and an amount of information of intra-prediction modes which are to be transmitted, so that it is possible to improve encoding efficiency.

Other Embodiments

As described above, the present invention has been described with reference to the embodiments described above, but it should not be understood that the description and the drawings that form a part of the disclosure in the embodiment limit the present invention. Various alternative embodiments, examples, and operational techniques will become apparent to those skilled in the art from the disclosure.

Further, while not specifically described in the above-described embodiments, a program which causes a computer to execute respective kinds of processing to be performed by the above-described encoding device 1 and decoding device 3 may be provided. Further, the program may be recorded in a computer readable medium. It is possible to install the program in a computer by using a computer readable medium. Here, the computer readable medium in which the program is recorded may be a non-transitory recording medium. The non-transitory recording medium is not particularly limited, and may be, for example, a recording medium such as a CD-ROM and a DVD-ROM.

Alternatively, a chip constituted with a memory which stores a program for implementing at least part of functions within the above-described encoding device 1 and decoding device 3 and a processor which executes the program stored in the memory may be provided.

This application claims the priority of Japanese Patent Application No. 2018-154249 (filed on Aug. 20, 2018) the contents of which are all incorporated herein by reference.

The invention claimed is:

1. An encoding device configured to divide an original image of a frame unit constituting a moving image into a plurality of blocks and encode the blocks, the encoding device comprising:
   an encoding processing order determiner configured to determine encoding processing order of blocks to be encoded;
   a generator configured to:
      acquire positions of available reference pixels around a block to be encoded based on the determined encoding processing order,
      determine whether the positions of the available reference pixels are adjacent on a right edge of the block to be encoded, and
      generate intra-prediction mode candidates of the blocks to be encoded, based on whether the positions of the available reference pixels are adjacent on the right edge of the block to be encoded;
   an intra-prediction mode determiner configured to determine intra-prediction modes to be applied to the blocks to be encoded from the generated intra-prediction mode candidates;
   an intra predictor configured to perform intra-prediction processing on the blocks to be encoded, based on the determined encoding processing order and the determined intra-prediction modes; and
   an entropy encoder configured to perform entropy encoding processing on the determined encoding processing order and the determined intra-prediction modes.

2. The encoding device according to claim 1, further comprising:
   an intra-prediction mode encoder configured to generate a most probable mode in accordance with the determined encoding processing order and encode the determined intra-prediction modes in accordance with the generated most probable mode.

3. The encoding device according to claim 1,
wherein a plurality of intra-prediction modes for performing direction prediction are classified into a plurality of categories in accordance with prediction directions,
the generator is configured to select at least one category to be applied to the blocks to be encoded from the plurality of categories based on the determined encoding processing order, and
generate the intra-prediction mode candidates including an intra-prediction mode belonging to the selected category.

4. The encoding device according to claim 1,
wherein the encoding processing order determiner comprises:
a detector configured to detect whether or not respective blocks adjacent on an upper side, on a lower side, on a left side and on a right side of the blocks to be encoded have been encoded;
a processing order candidate generator configured to generate candidates for encoding processing order selectable for child blocks obtained by dividing the blocks to be encoded, based on a detection result by the detector; and
a processing order determiner configured to determine encoding processing order to be applied to the child blocks among the generated candidates for the encoding processing order.

5. The encoding device according to claim 1,
wherein the generator comprises:
a detector configured to detect whether or not respective blocks adjacent on an upper side, on a lower side, on a left side and on a right side of child blocks obtained by dividing the blocks to be encoded have been encoded; and
a child block intra-mode candidate generator configured to generate intra-prediction mode candidates of the child blocks based on a detection result by the detector and the encoding processing order of the child blocks.

6. The encoding device according to claim 5,
wherein a plurality of intra-prediction modes for performing direction prediction are classified into a plurality of categories in accordance with prediction directions,
the plurality of categories include a category in which a plurality of intra-prediction modes are allocated clockwise from an upper left direction to a lower right direction, and a category in which a plurality of intra-prediction modes is allocated counterclockwise from the upper left direction to the lower right direction,
the child block intra-mode candidate generator is configured to select at least one category to be applied to the child blocks from the plurality of categories based on a detection result by the detector and the encoding processing order of the child blocks, and
generate the intra-prediction mode candidates including an intra-prediction mode belonging to the selected category.

7. A decoding device configured to decode an image of a frame unit constituting a moving image for each of divided blocks, the decoding device comprising:
   a decoding processing order acquirer configured to acquire decoding processing order of blocks to be decoded by performing entropy decoding processing on a stream output from an encoding device;
   a generator configured to:
      acquire positions of available reference pixels around a block to be decoded based on the acquired decoding processing order,
      determine whether the positions of the available reference pixels are adjacent on a right edge of the block to be decoded, and generate intra-prediction mode candidates of the blocks to be decoded, based on whether the positions of the available reference pixels are adjacent on the right edge of the block to be decoded;

an intra-prediction mode acquirer configured to acquire intra-prediction modes to be applied to the blocks to be decoded by performing entropy decoding processing on the stream based on the generated intra-prediction mode candidates; and an intra predictor configured to perform intra-prediction processing on the blocks to be decoded, based on the acquired decoding processing order and the acquired intra-prediction modes.

8. The decoding device according to claim 7, further comprising:

an intra-prediction mode decoder configured to generate a most probable mode in accordance with the acquired decoding processing order and decode the intra-prediction modes in accordance with the generated most probable mode and the generated intra-prediction mode candidates.

9. The decoding device according to claim 7, wherein a plurality of intra-prediction modes for performing direction prediction are classified into a plurality of categories in accordance with prediction directions, the generator is configured to select at least one category to be applied to the blocks to be decoded from the plurality of categories based on the acquired decoding processing order, and generate the intra-prediction mode candidates including an intra-prediction mode belonging to the selected category.

10. A decoding device configured to decode an image of a frame unit constituting a moving image for each of divided blocks, the decoding device comprising:

a decoding processing order acquirer configured to acquire decoding processing order of blocks to be decoded by performing entropy decoding processing on a stream output from an encoding device;

a generator configured to generate intra-prediction mode candidates of the blocks to be decoded, based on the acquired decoding processing order;

an intra-prediction mode acquirer configured to acquire intra-prediction modes to be applied to the blocks to be decoded by performing entropy decoding processing on the stream based on the generated intra-prediction mode candidates; and an intra predictor configured to perform intra-prediction processing on the blocks to be decoded, based on the acquired decoding processing order and the acquired intra-prediction modes, wherein the decoding processing order acquirer comprises:

a detector configured to detect whether or not respective blocks adjacent on an upper side, on a lower side, on a left side and on a right side of the blocks to be decoded have been decoded;

a processing order candidate generator configured to generate candidates for decoding processing order selectable for child blocks obtained by dividing the blocks to be decoded, based on a detection result by the detector; and a processing order determiner configured to determine decoding processing order to be applied to the child blocks from the generated candidates for the decoding processing order.

11. A decoding device configured to decode an image of a frame unit constituting a moving image for each of divided blocks, the decoding device comprising:

a decoding processing order acquirer configured to acquire decoding processing order of blocks to be decoded by performing entropy decoding processing on a stream output from an encoding device;

a generator configured to generate intra-prediction mode candidates of the blocks to be decoded, based on the acquired decoding processing order;

an intra-prediction mode acquirer configured to acquire intra-prediction modes to be applied to the blocks to be decoded by performing entropy decoding processing on the stream based on the generated intra-prediction mode candidates; and an intra predictor configured to perform intra-prediction processing on the blocks to be decoded, based on the acquired decoding processing order and the acquired intra-prediction modes, wherein the generator comprises:

a detector configured to detect whether or not respective blocks adjacent on an upper side, on a lower side, on a left side and on a right side of child blocks obtained by dividing the blocks to be decoded have been decoded; and a child block intra-mode candidate generator configured to generate intra-prediction mode candidates of the child blocks based on a detection result by the detector and the decoding processing order of the child blocks.

12. The decoding device according to claim 11, wherein a plurality of intra-prediction modes for performing direction prediction are classified into a plurality of categories in accordance with prediction directions, the plurality of categories include a category in which a plurality of intra-prediction modes are allocated clockwise from an upper left direction to a lower right direction, and a category in which a plurality of intra-prediction modes are allocated counterclockwise from the upper left direction to the lower right direction, the child block intra-mode candidate generator is configured to select at least one category to be applied to the child blocks from the plurality of categories based on a detection result by the detector and the decoding processing order of the child blocks, and generate the intra-prediction mode candidates including an intra-prediction mode belonging to the selected category.

13. A program for causing a computer to function as the encoding device according to claim 1.

14. A program for causing a computer to function as the decoding device according to claim 7.

* * * * *